(12) United States Patent
Arakawa

(10) Patent No.: US 7,369,114 B2
(45) Date of Patent: May 6, 2008

(54) IMAGE DISPLAY APPARATUS

(75) Inventor: Satoshi Arakawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 398 days.

(21) Appl. No.: 09/949,721

(22) Filed: Sep. 12, 2001

(65) Prior Publication Data

US 2002/0033791 A1   Mar. 21, 2002

(30) Foreign Application Priority Data

Sep. 12, 2000  (JP) ............................. 2000-276022

(51) Int. Cl.
   *G09G 3/36* (2006.01)
(52) U.S. Cl. ........................................ 345/102; 40/361
(58) Field of Classification Search .......... 345/1.1–1.3, 345/87–102; 40/361–367
   See application file for complete search history.

(56) References Cited

U.S. PATENT DOCUMENTS 4,809,314 A * 2/1989 Steele et al. ................. 378/205
6,269,565 B1 * 8/2001 Inbar et al. .................... 40/361
6,292,157 B1 * 9/2001 Greene et al. ............... 345/1.3
6,496,236 B1 * 12/2002 Cole et al. ..................... 349/61

FOREIGN PATENT DOCUMENTS

JP   11-276441 A   10/1999

* cited by examiner

*Primary Examiner*—Duc Q Dinh
(74) *Attorney, Agent, or Firm*—Sughrue Mion, PLLC

(57) ABSTRACT

The image display apparatus includes a flat-shaped transmission display device for displaying an image, a backlight corresponding to the display device and a control unit for controlling the backlight in such a way that a part of the backlight corresponding to a non-image area is turned off based on information concerning the image to be displayed. The apparatus is capable of cutting unnecessary light so as to be suitably used to the image diagnosis in a medical field and improving the visibility of the displayed image in the region of interest.

19 Claims, 4 Drawing Sheets

| RADIATION FIELD LIMITER | | | | FLUORESCENT LAMPS TO BE TURNED OFF |
|---|---|---|---|---|
| RIGHT | LEFT | TOP | BOTTOM | |
| ○ | ○ | | | 30a1,30a6 (FIG.3) |
| | | ○ | ○ | 30b1,30b2 (FIG.4) |
| ⋮ | ⋮ | ⋮ | ⋮ | ⋮ |

| RADIATION FIELD LIMITER | | | | FLUORESCENT LAMPS TO BE TURNED OFF |
|---|---|---|---|---|
| RIGHT | LEFT | TOP | BOTTOM | |
| ○ | ○ | | | 30a1, 30a6 (FIG.3) |
| | | ○ | ○ | 30b1, 30b2 (FIG.4) |
| ⋮ | ⋮ | ⋮ | ⋮ | ⋮ |

IMAGE DISPLAY APPARATUS

BACKGROUND OF THE INVENTION

1. Field of the Invention

The present invention relates to an image display apparatus, and more specifically, to an image display apparatus capable of cutting unnecessary light so as to be suitably used in a medical field.

2. Description of the Related Art

Various diagnostic image acquiring apparatuses utilizing X-rays etc. have conventionally been used in medical related fields. For instance, X-ray apparatuses, CR (computed radiography) apparatuses, CT (computed tomography) apparatuses, and MRI (magnetic resonance imaging) apparatuses are now in practical use.

Diagnostic image information acquired by these apparatuses is recorded on photographic films and is observed on a film viewer (Shaukasten). Alternatively, the diagnostic image information is recorded on other recording media, subjected to desired image processing such as frequency processing and gradation processing, and is displayed by image display apparatuses (monitor screens) for observation. In this manner, the diagnostic image information is used for diagnoses at medical care sites.

CRT display apparatuses have conventionally been used as the image display apparatuses, although they are recently replaced by so-called flat panel displays using liquid crystal panels or organic EL panels. Generally, these flat panel displays have various advantages over CRT display apparatuses. With such displays, for instance, installation spaces are saved, apparatus weights are reduced, and power consumptions are lowered. As a result, the flat panel displays are expected to become more and more widespread in various fields including the medical field.

It should be noted here that a CR (computed radiography) apparatus is a radiographic image recording and reading apparatus using an accumulative fluorescent material (stimulable phosphor) that operate as follows. First, radiation is emitted and a part of radiation energy is accumulated in the accumulative fluorescent material or the sutimulable phosphor. Then, excitation light such as visible rays or infrared light is emitted onto the accumulative fluorescent material or the stimulable phosphor, whereby the stimulated luminescence is exhibited according to the radiation energy accumulated therein. In the CR apparatus, first, radiographic image information of a subject, such as a human body, is recorded on the stimulable phosphor by an X-Ray apparatus and the like. Then, the radiographic image information represented by the stimulated luminescence is photoelectrically read to obtain image signals. Then, the thus obtained image signals are subjected to image processing. Finally, the thus processed image signals are output to display a soft copy image on an image display apparatus or to record a hardcopy image on a X-Ray photographic film.

Also, a CT (computed tomography) apparatus is based on a computed tomography method, with which projection images are obtained using parallel X-ray beams on straight lines from various angles and X-ray absorption coefficients of tissues in a human body, which represents the composition of the tissues, are obtained through computation of these data. The thus obtained composition of the tissues is output as a soft copy image or a hardcopy image. The tissue composition is reconstructed from the projection images using, for instance, a successive approximation method or an inverse-projection method.

Further, a usual MRI (magnetic resonance imaging) apparatus obtains an electromagnetic wave signal generated by a nuclear magnetic resonance effect of hydrogen atoms and converts the signal into an image. In more detail, an electromagnetic wave at a natural resonance frequency of nuclei is applied from the outside to place a nuclear magnetic moment due to spins in an excitation state. Then, the application of the electromagnetic wave is terminated under this condition to have the nuclei sequentially undergo a transition from the excitation state to a ground state. During this transition, an electromagnetic wave at a resonance frequency is emitted. This electromagnetic wave is received by coils and is converted into an image. The thus converted image is output as a softcopy image or a hardcopy image.

When a radiographic image is taken and recorded onto an x-ray film or a recording sheet (stimulable phosphor sheet) that uses the stated sutimulable phosphor in the radiographic image recording and reading apparatuses such as the CR apparatus, it is required to minimize the effect of radiation exposure on a living body and, for instance, to prevent the degradation of image quality due to scattered light resulting from light that is unnecessary for observation. Consequently, in many cases, a radiation field limiter made of lead or the like is used to limit a radiation field so that only necessary parts of a subject are exposed to radiation.

If image radiography is performed using the radiation field limiter, an image of a subject is recorded in a radiation field area of a recording medium such as an X-ray film or a stimulable phosphor sheet. Here, the radiation field area refers to an area of the recording medium within the outline of an opening of the radiation field limiter. On the other hand, radiation does not reach an area (outside area radiation field) of the recording medium outside the opening outline and therefore the extra-radiation field area remains in an unexposed state. Accordingly, the outline of the radiation field area (hereinafter, a "radiation field outline") corresponds to the opening outline and becomes an edge line.

FIG. 8A shows a X-ray image taking apparatus using a radiation field limiter, while FIG. 8B shows a stimulable phosphor sheet on which is formed a radiation field outline PS of an image that corresponds to the opening outline of the radiation field limiter. As shown in FIG. 8A, the radiation field limiter, which is made of a lead plate and has a rectangular opening, is arranged between an X-ray source and a subject. A portion of the radiation field limiter outside the opening prevents X-rays from reaching unnecessary parts of the subject and the stimulable phosphor sheet.

When the X-ray source emits X-rays toward the subject under this condition, X-rays passing through the subject strikes the stimulable phosphor sheet. During the emission of the X-rays, as shown in FIG. 8B, the outside area of the radiation field (the extra-radiation field area) Pout outside the opening of the radiation field limiter is not exposed to the X-rays, while the X-rays reach the area (the radiation field area) Pin within the opening and therefore X-ray information of the subject is recorded in this area. It should be noted that the X-ray image information of the subject is also recorded on an X-ray photographic film in the same way as the case of the stimulable phosphor sheet shown in FIG. 8B.

If the recording medium, on which an image has been recorded only within the radiation field area Pin, is directly observed (in case of the recording medium being an X-ray photographic film, for instance), or if an image generated by processing information read from such a recording medium with the radiographic image reading apparatus is observed (in case of the recording medium being a stimulable phosphor sheet, for instance), the extra-radiation field area of the recording medium is in an unexposed state and therefore does not bear any images. Consequently, the outside light passes through the extra-radiation field area during observation of the image and the observation is severely hindered by the passing light.

In more detail, if a plurality of X-ray photographic films are placed on a film viewer (Schaukasten) for observation or if a plurality of images are electrically displayed on a screen of an image display apparatus, the extra-radiation field area allows unnecessary light to enter into the eyes of an observer (mainly, a doctor). This is a great hindrance to observation of the images.

In view of this problem, the assignee of this patent application proposes a medical image display system in JP, 11-276441, A. In this system, LCDs (liquid crystal display apparatuses) are used to display images. Sensors for measuring the brightness of the outside light are provided in the vicinities of the display surfaces of the LCDs and the illumination of the backlight of each LCD is controlled according to the measurement results of these sensors.

This system is highly effective at controlling the illumination of each LCD, although not being effective for the light resulting from the stated extra-radiation field area. The problem discussed in this specification is to cut unnecessary light within an image display surface as much as possible.

SUMMARY OF THE INVENTION

In view of the stated problem, an object of the present invention is to solve a problem accompanying conventional techniques and to provide an image display apparatus capable of cutting unnecessary light so as to be suitable for medical use such as the image diagnosis in the medical field and improving the visibility of the displayed image in the region of interest.

In order to attain the object described above, the present invention provides an image display apparatus comprising: a flat-shaped transmission display device for displaying an image; a backlight corresponding to the display device; and a control unit for controlling the backlight in such a way that a part of the backlight corresponding to a non-image area is turned off based on information concerning the image to be displayed.

Preferably, the backlight is a light source that is capable of being two-dimensionally modulated.

Preferably, the light source capable of being two-dimensionally modulated is an array of a plurality of light sources containing at least one kind of dot shape light sources, line shape light sources and flat shape light sources.

Preferably, the dot shape light sources are white light emitting diodes the line shape light sources are white fluorescent lamps, rare gas fluorescent lamps, cool-cathode fluorescent lamps or the combination thereof, and the flat shape light sources are organic electro-luminescent panels or plasma display panels.

Preferably, the information concerning the image is at least one of presence or absence of a limiter while taking the image, a shape of the limiter and an image size of the image.

Preferably, the flat-shaped transmission display device is a liquid crystal panel.

Preferably, the apparatus comprises a plurality of image display units each comprising the flat-shape transmission display device, the backlight and the control unit, and the backlight corresponding to an entire area of the flat-shaped transmission display device which falls into the non-image area is totally turned off.

DETAILED DESCRIPTION OF THE PREFERRED EMBODIMENTS

The image display apparatus of the present invention is described below in detail with reference to the preferred embodiments shown in the accompanying drawings.

Figure 1:
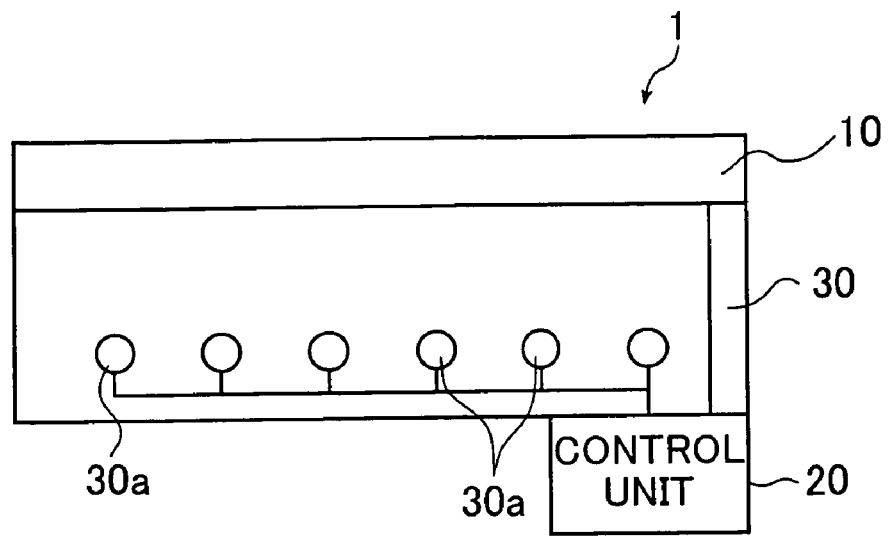
FIG. 1 is a schematic diagram showing the outline of the construction of a display unit of an image display apparatus according to an embodiment of the present invention.

FIG. 1 is a schematic diagram showing the outline of the construction of a display unit of an image display apparatus according to an embodiment of the present invention. In the display unit 1 shown in FIG. 1, reference numeral 10 denotes a liquid crystal panel and numeral 30 represents a light source unit (backlight) composed of a plurality of white (cold-cathode) fluorescent lamps 30a. A control unit 20 for controlling the liquid crystal panel 10, the light source unit 30, and other components is connected to the display unit 1.

In the image display apparatus of the present embodiment, the control unit 20 controls the illumination pattern of the light source unit (backlight) 30 according to various information on radiographic image such as the presence or absence of a radiation field limiter, the shape of the radiation field limiter, and an image size. Here, the various information is included in data that is supplied from an image data supplying source and shows X-ray photographic (radiographic) conditions under which an image to be displayed has been taken. This aspect will be described in more detail later.

Figure 2:
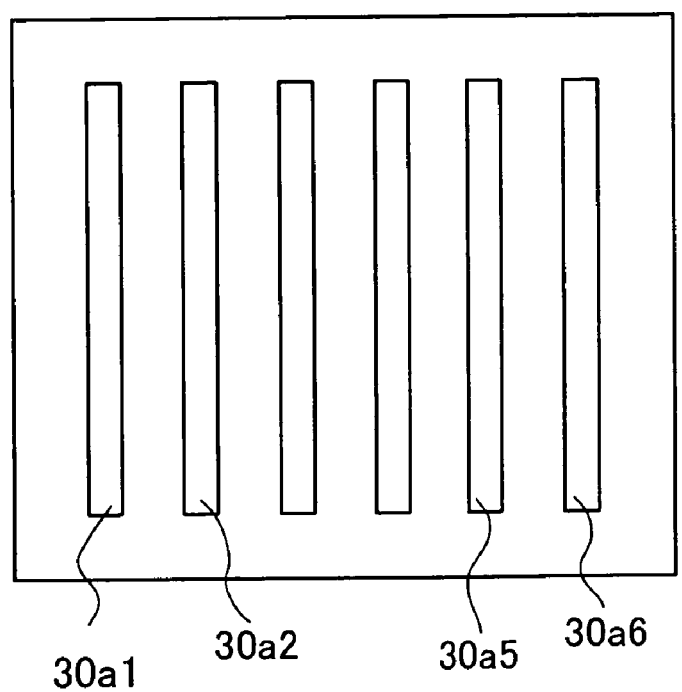
FIG. 2 shows an embodiment of the two-dimensional construction of an exemplary light source unit used in the image display apparatus shown in FIG. 1.
Figures 3, 4:
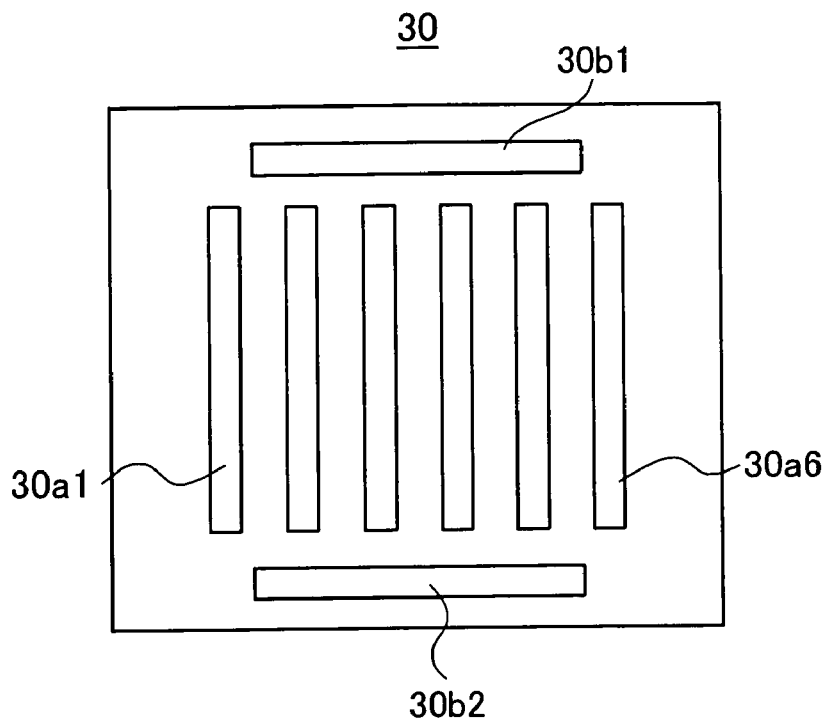
FIG. 3 shows another embodiment of the two-dimensional construction of the light source unit used in the image display apparatus shown in FIG. 1.
FIG. 4 shows an exemplary table that designates, based on image taking (radiographic) conditions, which fluorescent lamps should be turned off to adjust the light-emitting area of the light source unit of the image display apparatus.

FIG. 2 shows an embodiment of the two-dimensional construction of the light source unit 30. As shown in this drawing, the light source unit 30 includes a plurality of white fluorescent lamps 30a1, 30a2, . . . , 30a5, 30a6 arranged parallel to each other. FIG. 3 shows another two-dimensional construction of the light source unit 30. In FIG. 3, in addition to the plurality of white fluorescent lamps 30a1, . . . , 30a6 arranged parallel to each other, each of two white fluorescent lamps 30b1 and 30b2 is arranged at each of the top and bottom (front and rear) of the parallel white fluorescent lamps in a direction perpendicular to the direction in which the fluorescent lamps 30a1 to 3a6 are arranged.

As described above, in the image display apparatus of the present embodiment, the control unit 20 controls the illumination pattern of the light source unit (backlight) 30 according to various information on radiographic image (such as the presence or absence of a radiation field limiter, the shape of the radiation field limiter, and an image size) included in the data which is supplied from an image data supplying source and shows radiographic conditions under which an image to be displayed has been taken. FIG. 4 shows an exemplary table used to control the illumination pattern.

The table shown in FIG. 4 is stored in a memory (not shown) of the control unit 20 and designates the location of each fluorescent lamp to be turned off in accordance with the information concerning usage conditions (such as location, direction, and size) of a radiation field limiter used for an apparatus (image acquiring apparatus) that supplies image data and the information on radiographic image (such as image size). The control unit 20 can set the table for designating the location of a fluorescent lamp to be turned off in accordance with the information on radiographic image stored in advance in the memory. In this example as shown in FIG. 4, the control for turning off fluorescent lamps is performed in both a left-right direction and a top-bottom direction.

Figure 8A:
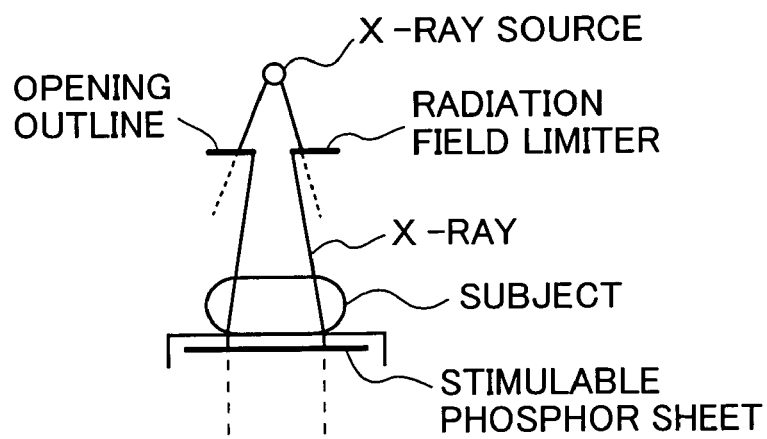
FIG. 8A shows an X-Ray image taking apparatus that uses a radiation field limiter.
Figure 8B:
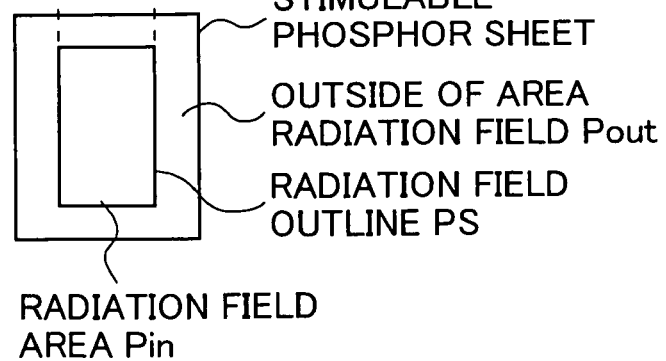
FIG. 8B shows a stimulable phosphor sheet on which a radiation field outline of an image corresponding to an opening outline of the radiation field limiter is formed by the apparatus shown in FIG. 8A.

In more detail, in the case where an image display apparatus including the light source unit 30 having the fluorescent lamps arranged in the manner shown in FIG. 2 is used to display an image using a radiation field limiter when it is taken (such as the radiation filed limiter shown in FIG. 8) that limits a radiation field in the left-right direction, information showing that such a radiation field limiter has been used is sent from the image acquiring apparatus. According to this information, the control unit 20 performs turn-off control so that the fluorescent lamps 30a1 and 30a6 on the left and right sides are turned off.

Similarly, in the case where an image display apparatus including the light source unit 30 having the fluorescent lamps arranged in the manner shown in FIG. 3 is used to display an image using a radiation field limiter when it is taken that limits a radiation field in the top-bottom direction, information showing that such a radiation field limiter has been used is sent from the image acquiring apparatus. According to this information, the control unit 20 performs turn-off control so that the fluorescent lamps 30b1 and 30b2 on the top and bottom sides are turned off.

It should be noted here that the control unit 20 may perform turn-off control so that the fluorescent lamps 30a1 and 30a6 on the left and right sides as well as the fluorescent lamps 30b1 and 30b2 on the top and bottom sides are turned off when a small-sized image is displayed.

In this embodiment, a light source unit including a plurality of fluorescent lamps is used as the backlight. In this case, by merely performing turn-off control for the fluorescent lamps, it becomes possible to adjust a light-emitting area of the backlight in accordance with the radiation field limiter used in various image acquiring apparatus and the information on radiographic image such as image size.

It should be noted that the fluorescent lamps used as the linear light sources in the present invention are not limited to any particular type. Ordinary types of fluorescent lamps such as hot cathode type, cold cathode type and rare gas type can be used and white fluorescent lamps are preferred.

The fluorescent lamps used have no particular limitations on the size (length and thickness), the shape and the number. For example, a plurality of short fluorescent lamps may be used instead of the fluorescent lamps shown in FIGS. 2 and 3. Alternatively, fluorescent lamps of thin type or thin and short type may be used to perform minute adjustment or control of the light-emitting area of the backlight.

Figure 5A:
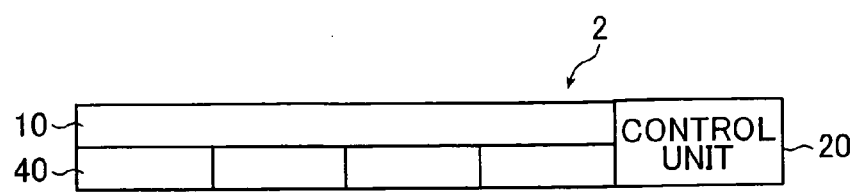
FIG. 5A is a schematic diagram showing the outline of the construction of a display unit of an image display apparatus according to another embodiment of the present invention.

FIG. 5A is a schematic diagram showing the outline of the construction of a display unit of an image display apparatus according to another embodiment of the present invention. In the display unit 2 shown in FIG. 5A, reference numeral 10 denotes the aforementioned liquid crystal panel and numeral 40 represents a light source unit (backlight) composed of a plurality of white organic EL (electro-luminescent) panels. As descried above, a control unit 20 for controlling the liquid crystal panel 10, the light source unit 40 composed of the organic EL panels, and other components is connected to the display unit 2.

Figure 5B:
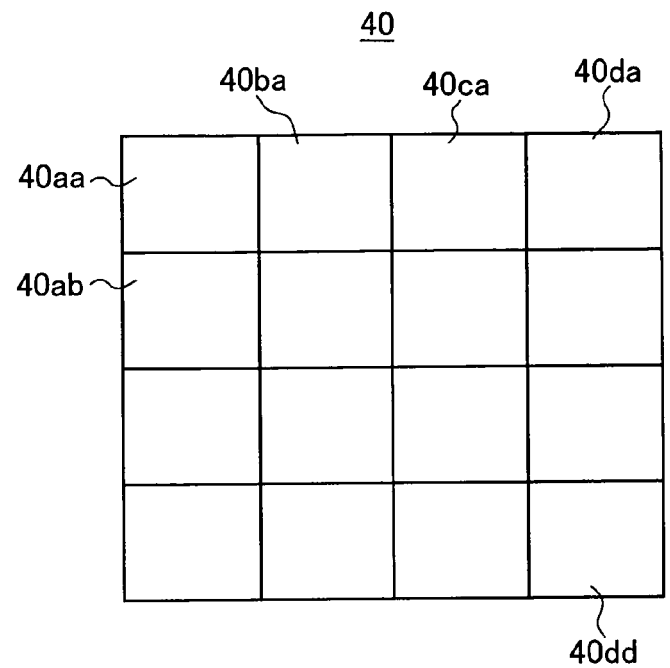
FIG. 5B is a plan view showing the two-dimensional construction of a light source unit used in the image display apparatus shown in FIG. 5A.

FIG. 5B is a plan view showing the outline of the construction of the light source unit 40 shown in FIG. 5A.

The light source unit (backlight) 40 shown in FIG. 5B includes the plurality of organic EL panels 40aa, 40ba, 40ca, 40da, 40ba, . . . , 40dd arranged in a 4×4 array so as to form a lattice pattern.

In the image display apparatus of the present embodiment, the control unit 20 performs turn-off control so that the light source unit (backlight) 40 composed of the organic EL panels 40aa, . . . , 40dd serving as the planar light sources is partially turned off in a similar manner as the turn-off control for the fluorescent lamps in the aforementioned embodiment. The image display apparatus of the present embodiment can adjust the light-emitting area of the backlight in accordance with the radiation field limiter used and the image size as in the aforementioned embodiment.

It should be understood that the embodiments discussed above are merely examples of the present invention and therefore there is no intention to limit the invention to these embodiments.

For instance, the display device is not limited to the liquid crystal panel stated above and other similar transmission display devices may be used.

Also, in addition to the fluorescent lamps and organic EL panels as described above, light sources which can be suitably used in constituting the backlight also include white LED (light-emitting diode) for the point (dot shape) light source and plasma display panel (PDP) for the planar (flat shape) light source.

Figure 6:
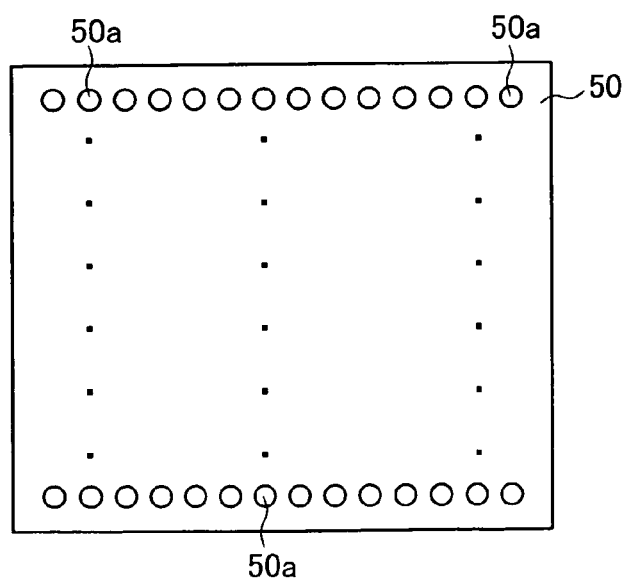
FIG. 6 is a plan view showing the two-dimensional construction of another light source unit used in the image display apparatus of the present invention.

When point light sources are used, an array light source such as an LED array including the point light sources such as LEDs 50a arranged in an array shape is preferably used as in a light source unit (backlight) 50 shown in FIG. 6. In this case, the respective point light sources have no particular limitations on the shape, the size and the number. These parameters can be selected in accordance with the amount of adjustment required for the light-emitting area of the backlight.

It should be noted here that each unit panel can be freely determined for the shape, the size and the number when light sources such as organic EL panel and PDP are used as in the light source unit 40 shown in FIGS. 5A and 5B.

As mentioned above, the backlight or light source unit can control turn-on and turn-off of a specified area and in particular a peripheral area of the display unit of the image display apparatus. More specifically, a light source capable of two-dimensional modulation is preferred in which a certain area in the display screen of the image display apparatus is completely turned off so that no image can be displayed. That is, the light source capable of two-dimensional modulation can be realized by providing a plurality of point light sources, linear (line shape) light sources or planar light sources and partially turning off the light sources appropriately, as mentioned above. It should be noted here that two or more of the point light source, linear light source and planar light source may be used in combination.

Further, if a light source whose color tone is adjustable is used to construct the backlight, this realizes an easily operatable image display apparatus that can control the light-emitting area size and image size as mentioned above while the color tone of the light source is adjusted depending on the type of the image acquiring apparatus used.

Figure 7:
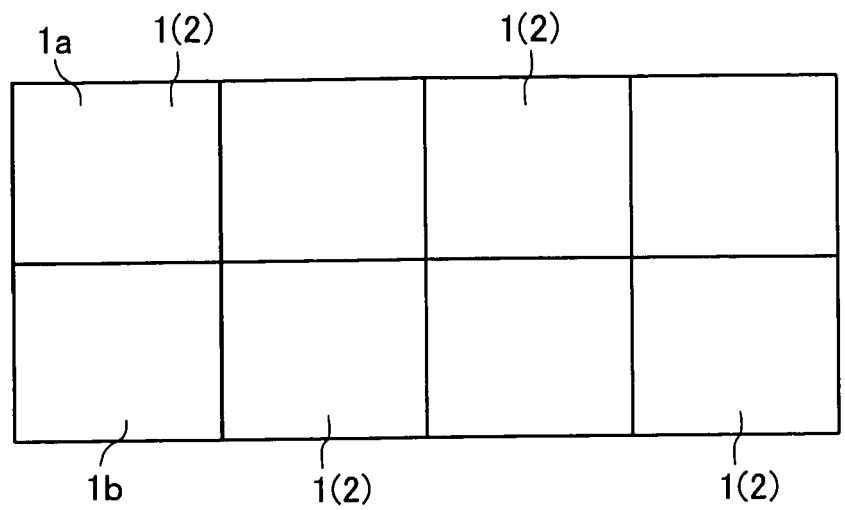
FIG. 7 is a schematic diagram showing the outline of the construction of a display unit of an image display apparatus according to still another embodiment of the present invention.

We now refer to the image display apparatus shown in FIG. 7 in which a plurality of display units 1 (see FIG. 1) or display units 2 (see FIG. 5A) each comprising the liquid crystal panel 10, the light source unit (backlight) 30, 40 or 50 (see FIG. 6) and the control unit 20 are arranged. For example, when the whole area of display units 1a and 1b corresponds to the non-image area, the backlights corresponding to the display units 1a and 1b, that is, all fluorescent lamps of the light source unit 30, all organic EL panels of the light source unit 40 or all LEDs of the light source unit 50 are preferably turned off completely.

Further, the display unit 1 shown in FIG. 1 or display unit 2 shown in FIG. 2 according to the present invention preferably includes a diffusion plate interposed between the liquid crystal panel 10 and the light source unit (backlight) 30 or 40.

In the present invention, the control unit 20 preferably performs automatic adjustment of the light-emitting area of the backlight by automatically turning off the individual light sources of the light source units 30, 40 and 50 including linear light sources such as fluorescent lamps, planar light sources such as organic EL panels and point light sources such as LEDs in accordance with the information on radiographic image. However, this is not the sole adjusting method of the invention and the light-emitting area of the backlight may be adjusted by manually turning off the individual light sources of the light source units in accordance with the information on radiographic image.

As described above in detail, the present invention achieves a pronounced effect by realizing an image display apparatus which is suitably used in image diagnosis in a medical field and which is capable of cutting unnecessary light and improving the visibility of an area of interest.

In more detail, by controlling the backlight according to the information on radiation field limiter and the information on image size which are both included in the image information such as radiographic conditions under which an image to be displayed has been taken, the present invention can provide an image display apparatus which is capable of cutting unnecessary light and improving the visibility of an area of interest and thus satisfy demands of observers.

What is claimed is:

1. An image display apparatus comprising:
a flat-shaped transmission display device for displaying on a display screen therof an image based on image signal data supplied from an image data supplying source;
a backlight corresponding to said display screen of said display device; and
a control unit for automatically controlling said backlight based on an information signal data concerning said image to be displayed in such a way that a part of said backlight corresponding to a non-image area on said display screen is turned off,
wherein said information signal data concerning said image is supplied from an image data supplying source together with said image signal data used for displaying said image on said display screen of said display device, and
wherein said image displayed on said display screen of said display device is a target image for a medical diagnostic use.

2. The image display apparatus according to claim 1, wherein said backlight is a light source that is capable of being two-dimensionally modulated.

3. The image display apparatus according to claim 2, wherein said light source capable of being two-dimensionally modulated is an array of a plurality of light sources containing at least one kind of dot shape light sources, line shape light sources and flat shape light sources.

4. The image display apparatus according to claim 3, wherein said dot shape light sources are white light emitting diodes said line shape light sources are white fluorescent lamps, rare gas fluorescent lamps, cool-cathode fluorescent lamps or the combination thereof and said flat shape light sources are organic electro-luminescent panels or plasma display panels.

5. The image display apparatus according to claim 1, wherein said information concerning said image includes at least one of an indication of a presence of a limiter while taking said image, a shape of said limiter and an image size of said image.

6. The image display apparatus according to claim 1, wherein said flat-shaped transmission display device is a liquid crystal panel, said liquid crystal display outputting an image based on the image signal data.

7. The image display apparatus according to claim 1, wherein said apparatus comprises a plurality of image display units each comprising said flat-shape transmission display device, said backlight and said control unit, and the backlight corresponding to an entire area of the flat-shaped transmission display device which falls into the non-image area is totally turned off.

8. The image display apparatus according to claim 1, wherein said control unit controls said backlight in such a way that a second part of said backlight corresponding to an image area of said display screen of said display device on which said image is displayed is turned on to brighten said image area and said part of said backlight corresponding to said non-image area of said display screen of said display device on which said image is not displayed is turned off to darken said non-image area.

9. The image display apparatus according to claim 1, wherein said image is capable of being displayed on a part of said display screen of said display device and said image area and said non-image area are capable of coexisting in said display screen of said display device.

10. The image display apparatus according to claim 1, wherein said backlight is disposed behind said display device and corresponds to said display screen of said display device.

11. The image display apparatus of claim 1, wherein the non-image area corresponds to a periphery where radiation exposure is not received in the image.

12. The image display apparatus of claim 1, wherein the non-image area corresponds to an area of the image of no medical significance.

13. The image display apparatus according to claim 11, wherein said control unit controls said backlight in such a way that a second part of said backlight corresponding to an image area of said display screen of said display device on which said image is displayed is turned on to brighten said image area and said part of said backlight corresponding to said non-image area of said display screen of said display device on which said image is not displayed is turned off to darken said non-image area.

14. The image display apparatus according to claim 1, wherein said control unit controls an illumination pattern of said backlight according to said information concerning said image.

15. The image display apparatus according to claim 14, wherein said control unit uses a table to control said illumination pattern of said backlight, and said table designates a location of said part of said backlight to be turned off in accordance with said information concerning said image.

16. The image display apparatus according to claim 15, wherein said control unit comprises a memory and sets said table for designating said location of said part of said backlight to be turned off in accordance with said information concerning said image, and said table is stored in advance in said memory, and turns off, using said table in said memory in accordance with said information concerning said image, said part of said backlight corresponding to said location of said backlight to be turned off.

17. The image display apparatus according to claim 1, wherein said control unit sets in advance a table for designating a location of said part of said backlight to be turned off in accordance with said information concerning said image, and comprises a memory for storing said table in advance.

18. The image display apparatus according to claim 1, wherein said control unit comprises a table for designating in advance a location of said part of said backlight to be turned off in accordance with said information concerning said image, and turns off, using said table in accordance with said information concerning said image, said part of said backlight corresponding to said location of said backlight to be turned off.

19. An image display apparatus comprising:
 a flat-shaped transmission display device for displaying on a display screen thereof an image based on image signal data supplied from an image data supplying source;
 a backlight corresponding to said display screen of said display device; and
 a control unit for automatically controlling said backlight based on information signal data concerning said image to be displayed in such a way that a part of said backlight corresponding to a non-image area on said display screen is turned off,
 wherein said information signal concerning said image is supplied from an image data supplying source together with said image data used for displaying said image on said display screen of said display device, and
 wherein said image displayed on said display screen of said display device is a target image for a medical diagnostic use,
 wherein said information signal data concerning said image includes at least one of a presence of a limiter while taking said image, a shape of said limiter and an image size of said image.

* * * * *